United States Patent
Callot et al.

(10) Patent No.: US 12,265,446 B1
(45) Date of Patent: Apr. 1, 2025

(54) MULTI-FACTOR ANOMALY DETECTION FOR APPLICATION EXECUTION ENVIRONMENTS

(71) Applicant: Amazon Technologies, Inc., Seattle, WA (US)

(72) Inventors: Laurent Callot, Berlin (DE); Alexander Zimin, Berlin (DE); Paul M. Vazquez, Berlin (DE); Nam Khanh Tran, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 1068 days.

(21) Appl. No.: 17/031,705

(22) Filed: Sep. 24, 2020

(51) Int. Cl.
*G06F 11/07* (2006.01)
*G05B 23/02* (2006.01)
*G06F 9/451* (2018.01)
*G06N 20/20* (2019.01)

(52) U.S. Cl.
CPC ........ *G06F 11/079* (2013.01); *G05B 23/0254* (2013.01); *G06F 9/451* (2018.02); *G06N 20/20* (2019.01)

(58) Field of Classification Search
CPC ....... G06F 11/079; G06F 9/451; G06N 20/20; G05B 23/0254
See application file for complete search history.

(56) References Cited

U.S. PATENT DOCUMENTS

| | | | |
|---|---|---|---|
| 8,931,101 B2 | 1/2015 | Baluda et al. | |
| 9,483,049 B2 | 11/2016 | Maeda et al. | |
| 9,652,354 B2 | 5/2017 | Filimonov et al. | |
| 10,103,960 B2 | 10/2018 | Boubez | |
| 10,223,403 B2 | 3/2019 | Malhotra et al. | |
| 10,270,788 B2 | 4/2019 | Faigon et al. | |
| 10,341,374 B1* | 7/2019 | Sadaghiani | G06F 18/217 |
| 11,675,687 B2* | 6/2023 | Kumar | G06F 11/0754 714/26 |
| 2006/0276995 A1* | 12/2006 | Breitgand | H04L 41/5009 702/179 |
| 2008/0229415 A1* | 9/2008 | Kapoor | H04L 63/14 726/22 |
| 2015/0033086 A1* | 1/2015 | Sasturkar | G06F 11/079 714/57 |
| 2015/0205691 A1* | 7/2015 | Seto | G06F 11/3409 702/182 |
| 2016/0217022 A1* | 7/2016 | Velipasaoglu | G06F 11/0709 |
| 2016/0285700 A1* | 9/2016 | Gopalakrishnan | G06N 20/00 |
| 2017/0061307 A1* | 3/2017 | Bates | H04L 41/142 |

(Continued)

OTHER PUBLICATIONS

U.S. Appl. No. 16/988,153, filed Aug. 7, 2020, Umut Orhan, et al.

*Primary Examiner* — Techane Gergiso

(74) *Attorney, Agent, or Firm* — S. Scott Foster; Kowert, Hood, Munyon, Rankin & Goetzel, P.C.

(57) ABSTRACT

A determination is made that anomaly analysis is to be performed with respect to an application. An anomaly score of the application is generated with respect to observed values of a plurality of metrics of the application. Generation of the anomaly score comprises computing an anomaly score contribution associated with an analysis of a correlation between values of a pair of metrics of the application. In response to a detection that the anomaly score exceeds a threshold, an anomaly response operation is initiated.

20 Claims, 11 Drawing Sheets

(56) References Cited

U.S. PATENT DOCUMENTS

| | | | |
|---|---|---|---|
| 2017/0279838 A1 | 9/2017 | Dasgupta et al. | |
| 2018/0219889 A1* | 8/2018 | Oliner | G06N 3/04 |
| 2019/0213099 A1* | 7/2019 | Schmidt | G06N 3/044 |
| 2019/0294485 A1* | 9/2019 | Kukreja | G06F 11/0772 |
| 2019/0294524 A1* | 9/2019 | Gupta | G06F 11/364 |
| 2019/0370610 A1* | 12/2019 | Batoukov | G06F 11/0754 |
| 2019/0372827 A1* | 12/2019 | Vasseur | H04L 41/0609 |
| 2020/0067948 A1 | 2/2020 | Baradaran et al. | |
| 2020/0104775 A1* | 4/2020 | Chintalapati | G06Q 10/06393 |
| 2020/0264965 A1* | 8/2020 | Harutyunyan | H04L 41/142 |
| 2020/0285737 A1* | 9/2020 | Kraus | G06F 21/552 |
| 2020/0287923 A1* | 9/2020 | Raghavendra | G06N 5/022 |
| 2020/0304550 A1* | 9/2020 | Feinstein | G06N 7/01 |
| 2020/0409339 A1* | 12/2020 | Arashanipalai | G06F 16/906 |
| 2021/0058424 A1* | 2/2021 | Chang | G06F 11/3409 |
| 2021/0084375 A1* | 3/2021 | Park | H04N 21/4532 |
| 2021/0097168 A1* | 4/2021 | Patel | G06F 21/554 |
| 2021/0141900 A1* | 5/2021 | Brown | G06F 21/57 |
| 2021/0168161 A1* | 6/2021 | Dunn | H04L 63/1441 |
| 2021/0232995 A1* | 7/2021 | Zhang | G06Q 10/06375 |
| 2021/0392170 A1* | 12/2021 | Kakinada | H04L 47/781 |

\* cited by examiner https://<website>/anomalyCauseAnalysis

The graphs below show metrics which our algorithms have identified as possible contributors to an anomaly identified for application execution environment MyApp1 in the time period between 2020-09-01-08:00:00 UTC and 2020-09-01-08:05:00 UTC. The top graph shows the growing divergence between key metrics M1 and M2, which led to the identification of the anomaly. The lower graphs show possible contributor metrics during the immediately prior hour which could be candidates for further investigation. ← 877

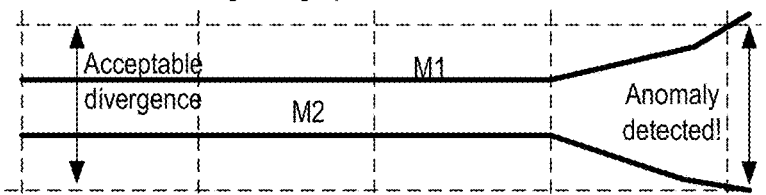

M1-M2 normalized divergence graph 805

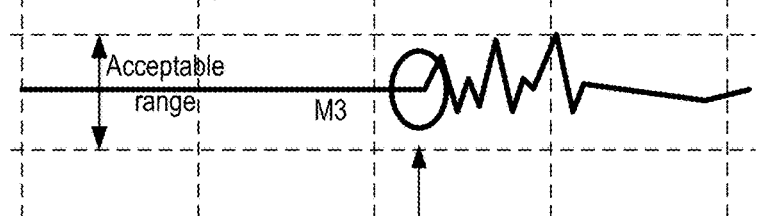

M3 normalized values graph 807

Candidate metric changes 855 for further analysis

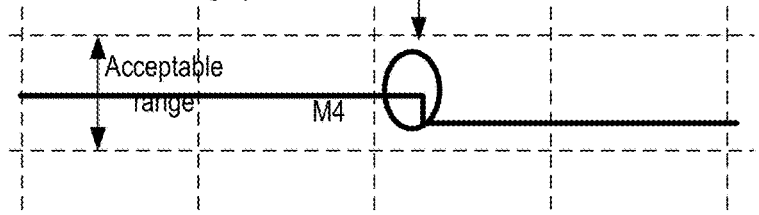

M4 normalized values graph 809

07:00:00     08:00:00

| View other metrics 811 | Zoom in/out 812 | ... |

Web-based interface 802

*FIG. 8*

MULTI-FACTOR ANOMALY DETECTION FOR APPLICATION EXECUTION ENVIRONMENTS

BACKGROUND

Many complex mission-critical applications are run using a distributed collection of resources, such as servers located at data centers of a provider network or cloud computing environment. For example, using resources of several different computing and/or storage services of a provider network, a global store may implement web sites enabling customers to view, select and purchase items from a catalog of millions of items that are available for sale. If a portion of such a web site becomes unavailable or unresponsive, customers may not be able to complete their interactions with the store smoothly.

In order to help avoid and remediate such events, administrators of the applications can in some cases manually configure monitoring services to capture metrics and raise alarms if/when the metrics values cross pre-selected thresholds indicating anomalous or unexpected behaviors. Manual configuration of monitoring thresholds may, however, quickly become impracticable as the number of resources used for an application rises. Furthermore, many false alarms may result from such manual configuration, wasting valuable debugging and remediation resources of the organizations involved in scenarios for which no action was actually needed.

BRIEF DESCRIPTION OF DRAWINGS

FIG. 8 illustrates an example graphical user interface which may be used to indicate candidate metrics for investigation in some embodiments, according to at least some embodiments.

Figure 1:
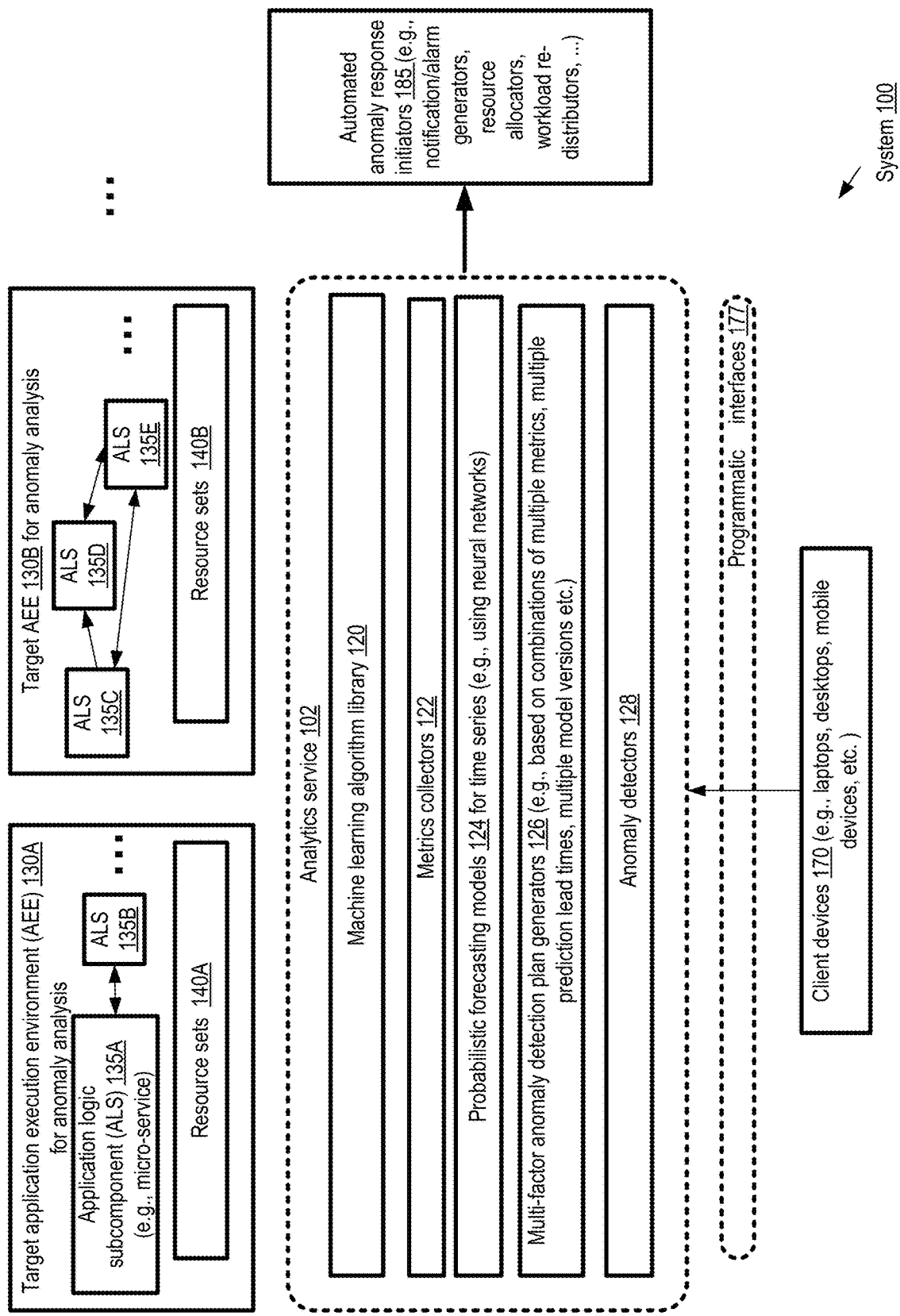
FIG. 1 illustrates an example system environment in which multi-factor anomaly detection may be implemented using metrics collected from application execution environments, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for detecting anomalous events or behavior patterns in large scale applications using combinations of forecasts of metrics collected with respect to various application components and resources, with automated experimentation techniques guiding the preparation of anomaly detection plans. For a given application, respective time series of metrics of various categories, such as resource-specific metrics (CPU utilizations, network transfers, memory usage and the like), application logic-based metrics (such as transaction rates or response times/latencies of application requests), error metrics (packet drop rates, connection refusals, etc.), are collected. Machine learning models (e.g., neural network based models) are trained (and re-trained periodically) to generate probabilistic predictions for the time series values—e.g., for a given metric for which a time series of observed values is available, respective predicted probability distributions are generated for various future time horizons. When a new value of the metric is obtained at a given point in time, it can be compared to the range of values of the predicted probability distribution for that point in time to determine whether that value is anomalous. An anomaly score can be computed for the new value, for example, based on a particular sub-range or quantile of the probability distribution's range within which the new value lies.

Instead of taking just one metric's anomaly score as of a single point in time into account to make a decision as to whether an anomalous event or behavior pattern which requires an alarm or some other response has occurred, the proposed approach takes several anomaly score contributions into consideration before making such decisions. Thus, in one simple example, an anomaly may be said to be detected if, for metrics M1, M2 and M3 each measured at times T1, T2 and T3, the average of the anomaly score contributions of M1, M2 and M3 for each of the time points T1, T2 and T3 exceeds a threshold. In another example, an anomaly may be detected if the rate of divergence between the values of M1 and M2 over a time period T1-T3 exceeds a threshold. In a third example, trends in the values of individual metrics over several successive points in time may be analyzed for anomalies. The particular combination of metrics, time horizons and the like which are considered for anomaly detection with respect to a given application, and the logic/rules to be used to combine them, may constitute components of an anomaly detection plan. In the proposed technique, a data-driven automated approach is used to generate anomaly detection plans, e.g., using machine learning to identify the appropriate combination of factors to be used for a given application execution environment to identify actionable anomalies. As a result of using multi-factor anomaly detection, unusual behaviors or events for which responses are actually needed may be detected much more quickly than is possible using conventional approaches, and some types of unwanted events/behaviors may be prevented entirely. In some cases, multi-factor anomaly detection may be implemented at an analytics service of a provider network or cloud computing environment, enabling the behavior of applications which utilize a mix of network-accessible services of the provider network to be analyzed for anomalies without requiring clients to allocate or provision specific resources needed for the analysis.

As one skilled in the art will appreciate in light of this disclosure, certain embodiments may be capable of achieving various advantages, including some or all of the following: (a) substantially reducing the time needed to detect and initiate response actions for anomalous events and patterns of behavior of large-scale applications (including cloud-deployed applications) in production environments, (b) reducing the amount of computation, storage and networking resources which may otherwise have to be used for responding to false positive reports of anomalies for such applications, (c) reducing the need for manual configuration of alarms and other monitoring settings, and (d) improving the user experience of debugging and support teams, e.g., by providing easy-to-understand evidence of the particular application components or resources which are likely to have contributed to anomalous events.

According to some embodiments, a system may comprise one or more computing devices, e.g., of an analytics service of a provider network or cloud computing environment. The computing devices may include instructions that upon execution on or across the one or more computing devices cause the one or more computing devices to identify a plurality of sources of respective metrics of an application. For example, the sources may include logs generated by various application subcomponents, agents of monitoring services already in use for resources utilized for the application, performance tools provided as part of the operating systems used at servers at which the application subcomponents run, and so on. A wide variety of metrics may be collected from the application such as metrics of completion of user requests/transactions directed to the application, resource utilization metrics, error metrics in various parts of the network used for accessing or implementing the application, latency metrics associated with various requests or messages used for the application, and so on.

An anomaly detection plan may be determined or selected for the application in various embodiments. The anomaly detection plan may include several elements. The plan may indicate, for example, one or more probabilistic forecasting models to be employed to analyze a collection of metric time series of the application. Such models may generate a predicted probability distribution of future values of one or more metric time series provided as input to models. In some embodiments, the anomaly detection plan may indicate one or more prediction lead times for which measured values of one or more metrics are to be analyzed with respect to predicted probability distributions of the metrics—e.g., that predictions made one minute in advance of a measurement, five minutes in advance and ten minutes in advance should be considered. In one embodiment, an anomaly detection plan may indicate a mapping between a range subdivision or quantile of a predicted probability distribution for a particular metric and an anomaly score contribution computed with respect to the particular metric. In some embodiments, the plan may include an indication that an anomaly score for the application is to be based at least in part on pairwise analysis (e.g., pairwise correlation, divergence, etc.) of one or more pairs of metrics of the application. In other embodiments, the plan may indicate that an anomaly score is to be based at least in part on group-wise analysis of metrics of the application, where individual groups may include two or more metrics. According to some embodiments, the anomaly detection plan may be generated at least in part using a machine learning model trained on a labeled data set which identifies anomalies which were detected earlier for similar applications (or the same application) and required remediation actions. As a result of using machine learning techniques trained using actionable anomaly examples, the probability of detecting false positive anomalies may be reduced in such embodiments. The anomaly detection plan may in effect provide information and guidance about how several anomaly score contributions are to be obtained and combined to produce the final anomaly score for various points in time.

In accordance with the anomaly detection plan, an anomaly score of the application may be generated or computed with respect to a set of observed values of one or more of the application's metrics in various embodiments. Generating the anomaly score may comprise, for example, aggregating several different anomaly score contributions. In one example scenario, one anomaly score contribution to the aggregation may comprise a measure of divergence of values of a pair of metrics over a time interval. Another example anomaly score contribution may be obtained using a mapping between range subdivisions of a predicted probability distribution of a particular metric for a particular prediction lead time indicated in the anomaly detection plan, and so on. In at least some embodiments, an anomaly detection plan may indicate a Boolean combination of conditions to be used to determine whether an actionable anomaly has occurred: e.g., that an anomaly is to be identified if metrics set (M1, M2) meets condition C1 with respect to their forecast probability distributions, AND if metric M3 meets condition C2 with respect to its forecast probability distribution.

If the aggregated anomaly score exceeds a threshold, one or more anomaly response operations may be initiated in some embodiments. For example, automated alarms or notifications may be transmitted to one or more destinations or individuals, one or more user requests of the application may be redirected to non-primary or alternate resources, additional resources may be allocated for executing various parts of the application logic, a root cause analysis workflow may be initiated, and so on. In at least some embodiments, if an anomaly is detected at a particular time T, the analytics service may provide a view of possible contributing events during a time period (T-delta) to T, e.g., via an easy-to-use graphical user interface, to help with the debugging and resolution of the root causes of the anomaly. Such an interface may indicate observed values of one or more metrics that have been identified as potentially likely to be relevant to the anomaly, and may include visual cues (such as icons or text notations) indicating particular changes in the metrics during the time interval which led to the identification of the metrics as candidates for further analysis. In at least some embodiments, a detection of a multi-factor anomaly may enable the prevention of an outage, e.g., so that the application remains available for end user requests.

In some embodiments, generating the final or aggregated anomaly score may comprise computing respective anomaly score contributions associated with a plurality of prediction lead times (indicated in the anomaly detection plan) for which respective predicted probability distributions are generated during a particular execution of a particular probabilistic forecasting model. In one embodiment, generating the final or aggregated anomaly score may comprise using several different versions or execution runs of a given forecasting model. For example, with respect to a particular metric, a plurality of anomaly score contributions associated with a particular prediction time T1 may be computed and aggregated, with individual ones of the plurality of anomaly score contributions determined using respective predicted probability distributions generated by respective executions E1, E2, E3, . . . of a particular probabilistic forecasting model M1 (or respective versions M1-V1, M1-V2, M1-V3, . . . of the model M1).

According to some embodiments, as suggested earlier, a multi-factor anomaly detection technique of the kind introduced above may be performed at a network-accessible analytics service of a provider network, e.g., in response to one or more programmatic requests directed to the analytics service by its clients. Clients may utilize the programmatic interfaces supported by the analytics service to specify various preferences pertaining to the analysis, including for example specific algorithms or models to be used, hyperparameters of the machine learning models (such as the features to be used for time series forecasting, etc.), and so on. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which multi-factor anomaly detection may be implemented using metrics collected from application execution environments, according to at least some embodiments. As show, system 100 comprises resources and artifacts of an analytics service 102, including a machine learning algorithm library 120, metrics collectors 122, probabilistic forecasting models 124, multi-factor anomaly detection plan generators 126, and anomaly detectors 128. The analytics service 102 may implement a set of programmatic interfaces 177 in the depicted embodiment, such as one or more web-based consoles, command-line tools, application programming interfaces (APIs), graphical user interfaces, and the like. The programmatic interfaces 177 may be utilized by clients of the analytics service 102 to submit requests pertaining to anomaly analysis of one or more target application execution environments (AEEs) and to receive corresponding responses. The requests may be transmitted from a variety of client devices 170, such as laptops, desktops, mobile devices and the like in various embodiments.

Clients of the analytics service may provide information about the target AEEs at which potentially anomalous events and behavior patterns are to be detected. A descriptor of an application or of an AEE 130, such as 130A or 130B, provided via programmatic interfaces 177 may indicate, for example, respective application logic subcomponents (ALSs) 135 which collectively perform the functions of an application, a set of resources used for each of the ALSs, a set of key logical metrics of the application and so on. In some embodiments, complex applications may be designed and developed as a collection of micro-services, each performing some portion of the application's logic using a respective resources and interacting with other micro-services to fulfill end user requests. In the depicted examples, target AEE 130A includes resource sets 140A for ALSs 135A and 135B which interact with one another, while target AEE 130B includes ALSs 135C, 135D and 135E and resource sets 140B. In some embodiments, the respective sets of metrics may be defined (e.g., by application owners, developers or administrators) for one or more ALSs or for the application as a whole, such as end user request transaction arrival and completion rates, web page access latencies/response times, rates of transmissions of messages between ALSs, latencies or response times for various end user and internal requests, and the like. In at least some embodiments, resource sets 140 of an AEE 230 may comprise resources of one or more provider network services, such as a virtualized computing service, a storage service, or a database service, each of which may generate respective sets of metrics (such as CPU utilizations, memory utilizations, network bandwidth usage, counts of network connections in use, storage device usage, network error/retry rates, etc.). In at least one embodiment, some AEEs may utilize resources located at client premises outside the provider network, and metric time series may be collected from such external resources as well to detect anomalies.

Values of the metrics generated at the ALSs and the associated resource sets may be obtained by metrics collectors 122, implemented at one or more computing devices of the analytics service 102, as respective time series in the depicted embodiment. Depending on the particular metric, the time series values may be collected from a variety of sources in various embodiments—e.g., timestamped logs of transaction requests and completions may be accessed, monitoring agents instantiated at various provider network service resources may provide resource-specific metrics, and so on. In at least some embodiments, indications of the metrics sources associated with a given application to be analyzed for anomalies may be provided to the analytics service 102 by clients.

According to at least some embodiments, for any given application and associated AEE, an anomaly detection plan may be determined or generated at the analytics service. The plan may indicate various properties and parameters to be used to determine whether the application is exhibiting anomalous behavior for which a responsive action is to be initiated. For example, a given plan may indicate one or more probabilistic forecasting models 124 to be employed to analyze a collection of metric time series of the application. Such models may implement any of a variety of types of algorithms from machine learning algorithm library 120 in different embodiments, such as recurrent neural network based algorithms, transformer algorithms, convolutional neural network algorithms, autoregressive moving average algorithms, and so on. Each such model may generate, for a given time series (or set of time series) provided as input, a predicted probability distribution of future values of the time series. In some embodiments, an anomaly detection plan may indicate one or more prediction lead times for which measured values of one or more metrics are to be analyzed with respect to their predicted probability distributions, mapping functions between a range subdivision of a predicted probability distribution for a particular metric and an anomaly score contribution computed with respect to the particular metric, and/or indications of the particular combinations of metrics which are to be considered when determining whether an anomaly has occurred. In one example scenario, the anomaly detection plan may indicate that an anomaly score for an application is to be based at least in part on pairwise analysis of one or more pairs of metrics of the application, specifying the particular pairs of metrics to be analyzed. In some embodiments, portions of the anomaly detection plan for an application may be indicated by a client of the analytics service 102 via programmatic interfaces. In other embodiments, at least a portion of the anomaly detection plan may be generated automatically, e.g., by multi-factor anomaly detection plan generators 126 implemented at one or more computing devices based on experiments and analysis using additional machine learning algorithms of library 120.

After an anomaly detection plan for a given AEE 130 has been determined, it may be implemented by an anomaly detector 128 implemented at one or more computing devices of the analytics service 102 in the depicted embodiment. Such an anomaly detector 128 may generate, in accordance with the anomaly detection plan, an anomaly score of the application with respect to a respective set of observed values of one or more metrics at various points in time. In order to generate the overall score, the anomaly detector may aggregate a plurality of anomaly score contributions corresponding to different factors and parameters indicated in the anomaly detection plan. For example, some anomaly score contributions which are aggregated with others may be associated with a divergence of values of pairs of metrics identified in the plan, other contributions may be obtained using the mapping functions and prediction lead times indicated in the plan, and so on.

After the aggregated anomaly score is computed at a particular point in time, the anomaly detector may determine whether the score exceeds a threshold in the depicted embodiment. In some implementations, the threshold itself may be learned using machine learning techniques; in other embodiments, a default value (e.g., 0.8 on a scale of anomaly score values between 0.0 and 1.0) may be used for the threshold, or a value indicated by a client may be used. If the score exceeds the threshold, one or more anomaly response operations may be initiated in at least some embodiments. In the embodiment depicted in FIG. 1, an indication of the anomaly may be transmitted from the analytics service 102 to one or more downstream automated anomaly response initiators 185. The automated anomaly response initiators 185 may, for example, comprise notification or alarm generators, resource allocators which cause additional resources to be deployed for ALSs 135 of the application at which the anomaly was detected, workload re-distributors which cause newly-received user requests to be redirected to an alternative or backup resource set 140, and so on. In some embodiments, clients may specify the particular types of automated actions which are to be initiated in response to detected anomalies.

High-Level Workflow for Multi-Factor Anomaly Detection

Figure 2:
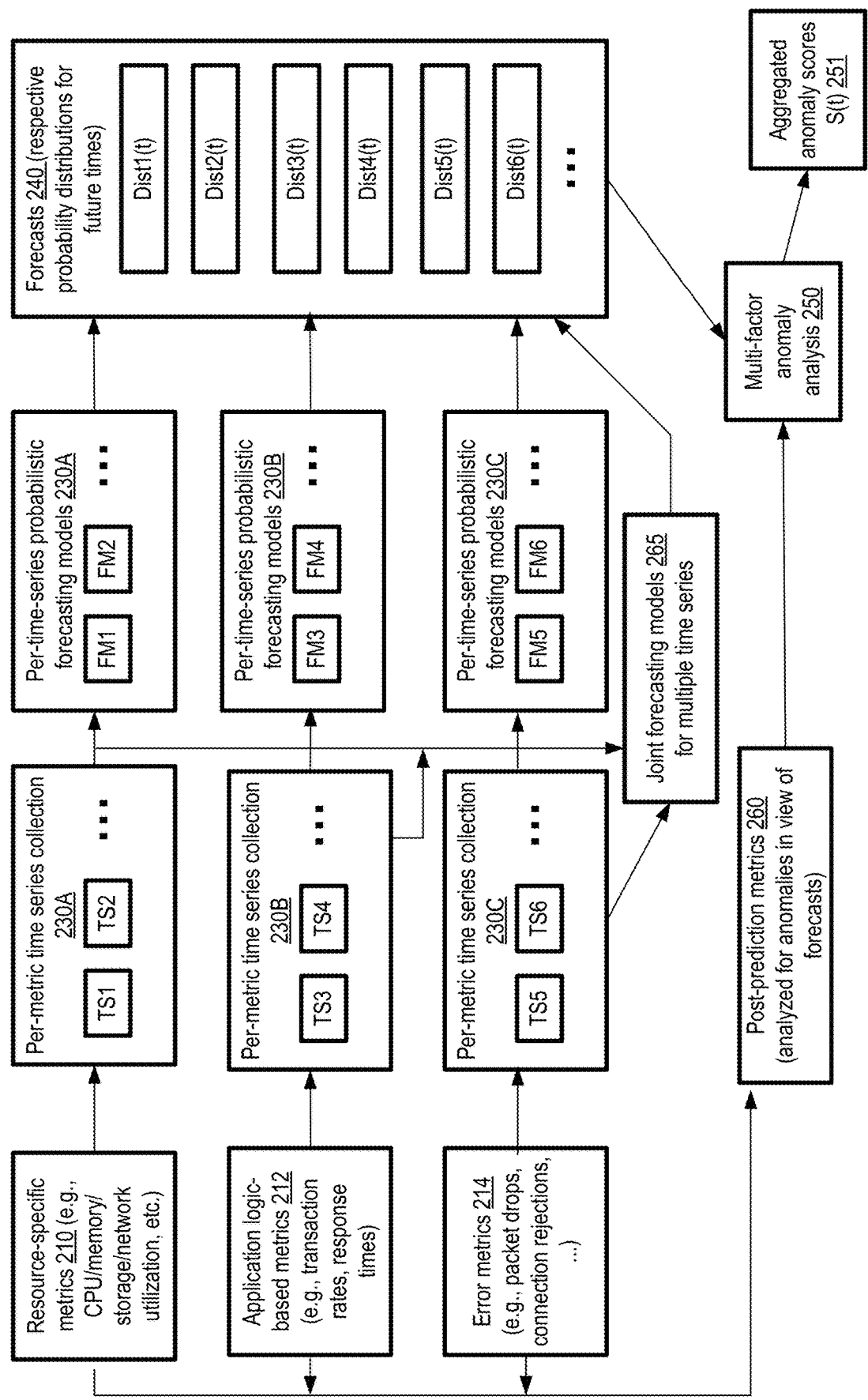
FIG. 2 illustrates an example workflow for multi-factor anomaly analysis, according to at least some embodiments.

FIG. 2 illustrates an example workflow for multi-factor anomaly analysis, according to at least some embodiments. In the embodiment depicted in FIG. 2, anomaly analysis may be based on combinations of at least three types of metrics of the targeted applications: resource-specific metrics 210, application logic-based metrics 212, and error metrics 214. Other types of metrics may also be considered in some embodiments. Resource-specific metrics 210 may include, for example, utilization levels for physical or virtualized CPUs, memory, storage devices, and network interfaces and links. Application logic-based metrics 212 may include, for example, transaction arrival and completion rates for various types of transactions requested by users of the targeted applications, response times for various end-user requests, rates or response times for internal messages between application logic subcomponents or micro-services, navigation metrics for different web pages of a web site used for the application (e.g., the rates at which users navigated from web page P1 to web page P2 via a particular web link WL1), and so on. Error metrics 214 may include packet drop rates at various parts of the network used for the application, connection rejections, rates of exceptions encountered in the programs implementing the applications, and so on.

Corresponding to the different metrics of each category, respective per-metric time series collections such as 230A, 230B and 230C may be obtained from the appropriate metrics sources in various embodiments. Collection 230A may comprise time series TS1 and TS2, for example, collection 230B may comprise TS3 and TS4, and collection 230C may comprise TS5 and TS6.

Several different types of probabilistic forecasting models may be employed in different embodiments for the time series. In some embodiments, a set of per-time-series probabilistic forecasting models such as 230A, 230B or 230C may be used. Each per-time-series model, such as FM1, FM2, FM3, FM4, FM5 or FM6, may take a respective time series such as TS1-TS6 as input, and generate probability distributions for future values of the time series corresponding to one or more lead times (the times between when the forecast is generated and when the predicted values are to be captured). In at least one embodiment, instead of or in addition to per-time-series forecasting models, one or more joint forecasting models 265 may be employed. Such a joint forecasting model 265 may consume more than one time series as input, and generate combined or joint probability distributions for all the input time series for various time horizons or lead times.

Using the different models available, a set of forecasts 240 comprising respective probability distributions as a function of time may be obtained in various embodiments. Forecasts 240 may include respective sets of time-varying distributions $Dist1(t)$, $Dist2(t)$, $Dist3(t)$, $Dist4(t)$, $Dist5(t)$, $Dist6(t)$ and so on. As and when post-prediction metrics 260 become available, they may be analyzed in view of the forecasts 240 as part of the multi-factor anomaly analysis 250 in the depicted embodiment, resulting in the computation of aggregated anomaly scores 251 for various points in time. A given aggregated anomaly score $S(t)$ may, for example, be generated based on determining where along the range of predicted values some number of post-prediction values lie, mapping the placement of the values to respective anomaly score contributions, and combining the anomaly score contributions.

Example Time Series Forecasting Techniques

Figure 3:
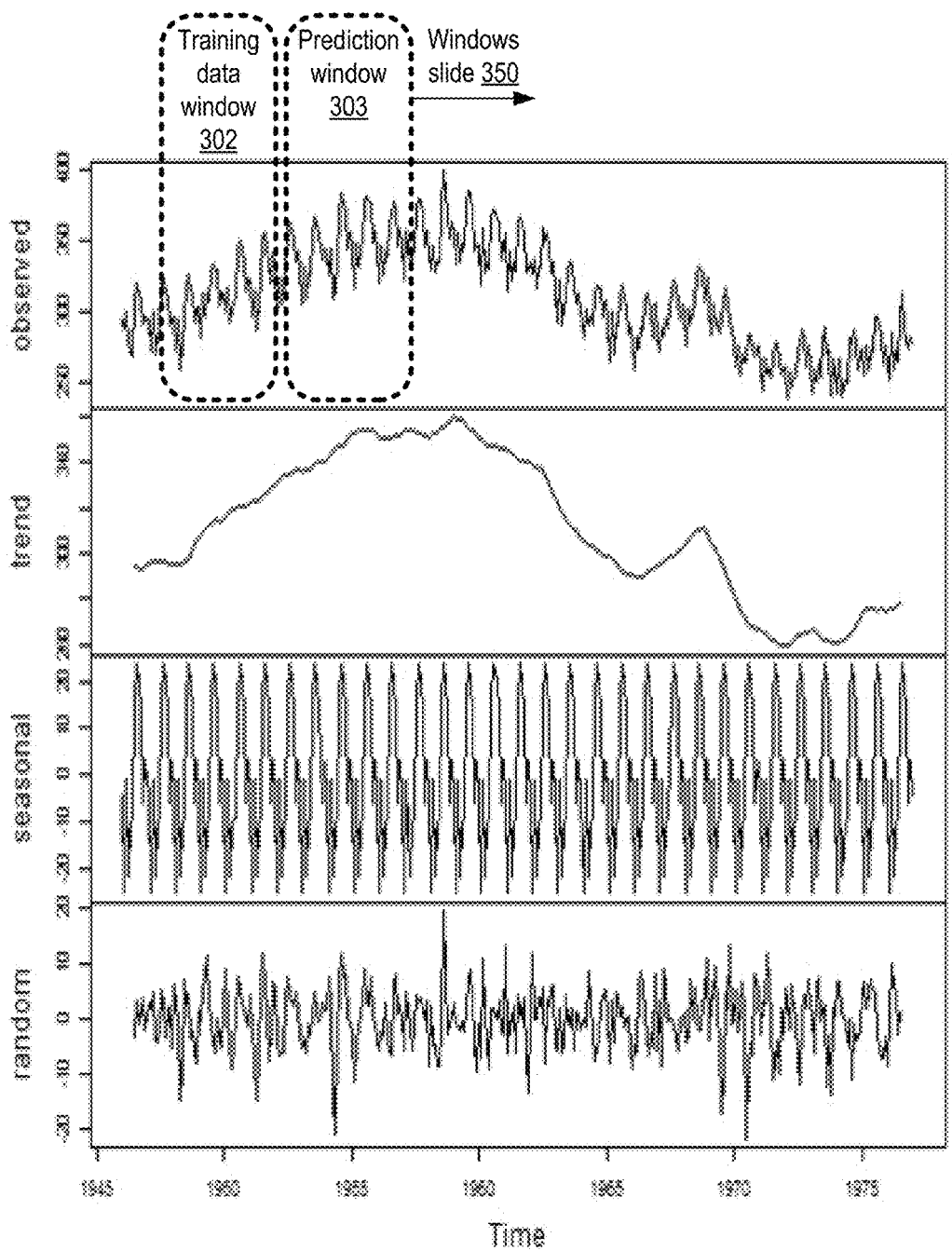
FIG. 3 illustrates an example window-based technique for forecasting time series values, according to at least some embodiments.

A number of approaches may be taken with respect to forecasting future values of individual time series in different embodiments. FIG. 3 illustrates an example window-based technique for forecasting time series values, according to at least some embodiments. In the window-based technique, from a given set of collected observed values of a time series such as example time series 310, one or more training data windows (such as training data window 302) and corresponding prediction windows (such as prediction window 303) may be extracted, e.g., using random sampling. Such pair of windows may then be used to train a probabilistic forecasting model (similar to per-time-series models shown in FIG. 2) for the time series 310. The quality of the model predictions may be evaluated using the known values in the prediction windows. The windows may be repositioned along the timeline of available observations, as indicated by the window slide arrow 350, to capture different kinds of variations in the time series.

Figure 5:
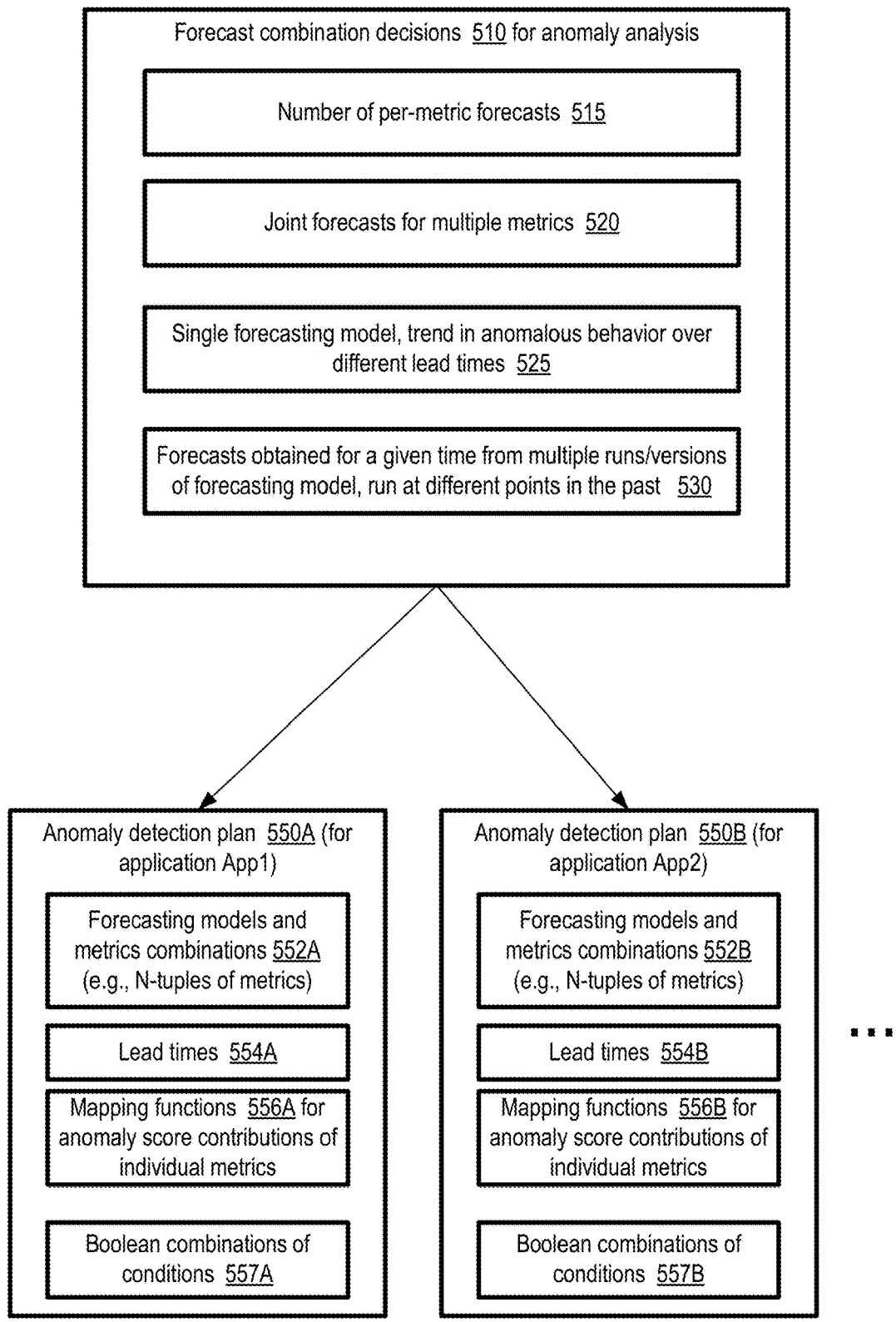
FIG. 5 illustrates example forecast combination options which may be specified in anomaly detection plans, according to at least some embodiments.

In at least some embodiments, an approach that takes structural assumptions about the time series into account may be used in a probabilistic forecasting model. To motivate such an approach, examining the manner in which the values of example time series 310 may be deconstructed or decomposed may be helpful. The data points plotted in the "observed" portion at the top of FIG. 5 represent the number of live births (in thousands) recorded in each successive month in the United States from 1948 to 1979. The raw data was obtained from the "birth" subcomponent of the Applied Statistical Time Series Analysis ("astsa") package of a version of the R statistical computing environment.

As is evident from the "observed" portion of FIG. 3, the displayed time series sequence exhibits a number of temporal patterns. For example, there seems to be some amount of seasonal variation (not too different from year to year), with a peak in the summer months and a trough in the winter months. The random fluctuations in the data appear to be roughly equal in size over the time range. As a result, an additive model may, at least in principle, be used to describe the data. In an additive model, the observed time series is assumed to be the sum of a plurality of independent components around some average or "level," such as (in the example shown in FIG. 3) a trend component, a seasonal component, and a random or irregular component. In contrast, if the amplitude of the seasonal variations and/or random fluctuations change substantially over time, a multiplicative model may be used (in which the observed values are assumed to be the product of the components rather than the sum), or the time series data may be transformed (e.g., using logarithms) to conform to an additive modeling methodology.

The lower three curves shown in FIG. 3, labeled "trend", "seasonal" and "random" represent respective estimates for the three subcomponents obtained using the "decompose ( )" function in R, under the assumption that the time series was suitable for an additive model. Plotting the estimates of the components separately as in FIG. 3 may be helpful in developing overall intuitions about the variations in the data over time, and in motivating the inclusion of level, trend and seasonal structural assumptions into various types of probabilistic forecasting models including recurrent neural network based models.

Example Mappings from Forecast Distributions Sub-Ranges to Anomaly Scores

Figure 4:
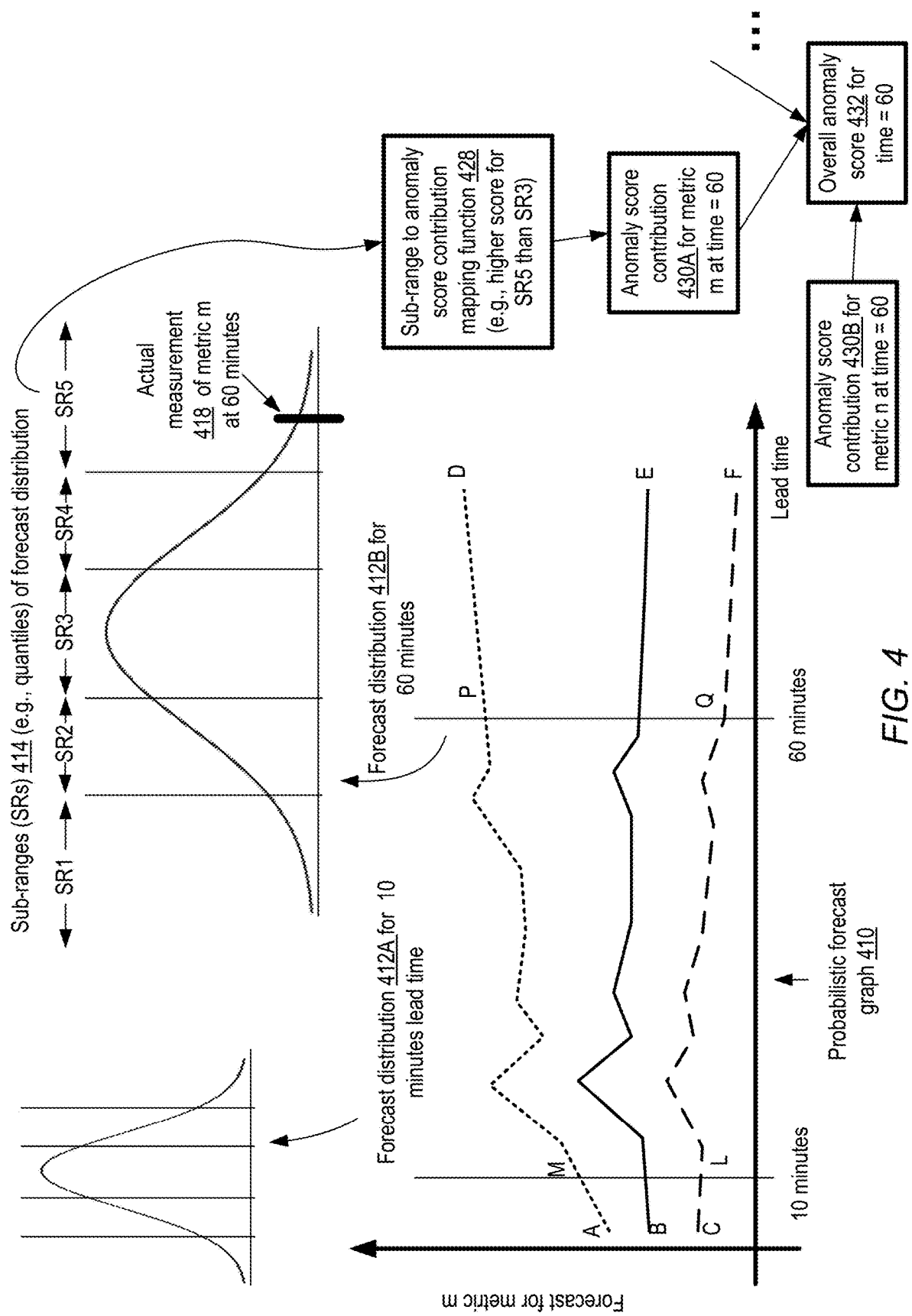
FIG. 4 illustrates example mappings from sub-ranges of forecast distributions to anomaly score contributions, according to at least some embodiments.

FIG. 4 illustrates example mappings from sub-ranges of forecast distributions to anomaly score contributions, according to at least some embodiments. In the depicted embodiment, lead time (i.e., the difference between the time for which the forecast is to apply, and the time when the forecast is predicted) increases from left to right on the X-axis of probabilistic forecast graph 410 for a particular metric m of an application execution environment. The lead time is expressed in minutes. By way of example, the metric m represented along the Y axis of graph 410 could be the predicted number of successfully processed transactions of a particular type of transaction which can be initiated by an end user of an application, the predicted consumption of CPU in a particular logical subcomponent of the application, and so on.

The curves AMPD, BE, and CLQF may correspond to respective percentiles of the predicted ranges of m in some embodiments. For example, AMPD could represent a $90^{th}$ percentile, BE a $50^{th}$ percentile, and a CLQF a $10^{th}$ percentile with regard to the predicted values of m. Multiple (e.g., hundreds or thousands) of executions of a given probabilistic forecast model may be performed relatively quickly in some implementations, each resulting in a different curve over the prediction interval due to the use of sampling-based techniques. The respective curves corresponding to the individual executions may be analyzed and aggregated to obtain the probabilistic forecast distributions shown in FIG. 4 for various points in time. For example, for a 10 minute lead time, forecast distribution 412A may be generated, while for a 60-minute lead time, forecast distribution 412B may be generated. As indicated by the relative widening of the gap between the AMPD curve and the −CLQF as the lead time increases, the uncertainty of the forecast produced may increase as time periods further in the future are considered. For example, for 10 minutes in the future, the gap between the $90^{th}$ percentile curve and the $10^{th}$ percentile curve may correspond to the length of segment ML, while for 60 minutes in the future, the gap may correspond to the longer segment PQ.

The range of values predicted for metric m at any given lead time may be divided into sub-ranges 414 or quantiles in the depicted embodiment. For example, the range of values of m in forecast distribution 412B is divided into sub-ranges (SR) SR1, SR2, SR3, SR4 and SR5. Given the shape of the distribution curve (which may differ from one model or one time point to another), the most likely values of m belong to sub-range SR3; values in SR2 and SR4 are considered less likely, and values in sub-ranges SR1 or SR5 are considered least likely and hence most anomalous. The actual measurement 418 of m at the point in time corresponding to the 60-minute lead time lies within the SR5 sub-range in the depicted example. A sub-range to anomaly score contribution mapping function 428 may be applied to the sub-range within which the actual measurement falls in the depicted embodiment, producing an anomaly score contribution 430A for metric m at lead time=60. The anomaly score contribution may, for example, be expressed as a real number between 0 and 1, an integer between 0 and 100, or in other forms in different embodiments.

Similar sub-range mapping based anomaly score contributions such as 430B may be obtained with respect to the 60-minute lead time for all the different metrics (such as metric n in the case of contribution 430B) which are being considered for multi-factor anomaly detection in various embodiments. The different contributions may then be combined or aggregated to compute the overall anomaly score 432 for lead time 60 minutes in the depicted embodiment. Any of a variety of aggregation approaches may be employed in different embodiment, such as summing the contributions, selecting the maximum of the contributions, computing the mean of the contributions, and so on, depending for example on the anomaly detection plan being used.

Example Forecast Combination Options

FIG. 5 illustrates example forecast combination options which may be specified in anomaly detection plans, according to at least some embodiments. As shown, forecast combination decisions 510 which may be made to generate anomaly detection plans 550 (such as 550A or 550B) may include decisions as to the number of per-metric forecasts 515 which are to be used for generating anomaly scores and whether joint forecasts for multiple metrics 520 are to be used. For some large-scale applications, the number of metrics available may run into the thousands, so selecting a subset of per-metric forecasts may be important in some embodiments. Models which make joint predictions for several different metrics (referred to as multivariate models) may be useful in reducing the total number of models/forecasts used, but may be harder to train than single-metric forecasting models in some embodiments.

Lead times for the forecasts from which the anomaly score contributions are derived may represent another dimension of the forecast combination decisions 510 in the depicted embodiment. In some cases, it may be useful to choose a single forecasting model, and analyze the trend in the anomalous behavior of the metric(s) forecast by the model over different lead times, as indicated in element 525. For example, consider a forecasting model FM-A from which respective forecast probability distributions Dist5, Dist10 and Dist15 for a given metric M1 for lead times of 5 minutes, 10 minutes, and 15 minutes are obtained. Intermediary anomaly score contributions AS-5, AS-10 and AS-15 may be computed (e.g., using sub-range mappings as discussed above) for M1 for the three different lead times when as the actual measured values of M1 become available over 15 minutes. If the anomaly score contributions keep rising over time (e.g., if AS-5<AS-10<AS-15), this may lead to the assessment that an anomaly response action should be undertaken in some embodiments; as such, trends in anomalous behavior may be used to decide that an actionable anomaly has occurred. Such trend-based anomaly analysis may be especially useful in detecting slowly growing problems such as memory leaks and the like in at least some embodiments.

Another option with respect to temporal combinations is to consider forecasts obtained for a given time from multiple runs (or multiple versions) of a forecasting model, run at different points in the past, as indicated by element 530 in FIG. 5. In this option, predictions generated by three executions of a model FM-A, at time T1, T2 and T3 respectively, for the same post-prediction metric measurement time may be obtained. For example, T1 may be 15 minutes before the measurement time, T2 may be 10 minutes before the measurement time, and T3 may be 5 minutes before the measurement time. Then, respective anomaly score contributions with respect to each of the three predictions and the value of the metric at the measurement time may be computed and aggregated.

In the embodiment depicted in FIG. 5, a given anomaly detection plan to be executed for an application may indicate the forecasting models and metrics combinations to be used to detect anomalies, the set of lead times to be considered, the mapping functions to be used to generate the anomaly score contributions for measured metric values (e.g., similar to mapping function 428 of FIG. 4), and whether Boolean combinations of conditions associated with the anomaly score contributions are to be considered when deciding whether an anomaly has been detected. For example, anomaly detection plan 550A for application App1 indicates forecasting models and metrics combinations 552A, lead times 554A, mapping functions 556A and Boolean combination of conditions 557A, while anomaly detection plan 550B for application App2 indicates forecasting models and metrics combinations 552B, lead times 554B, mapping functions 556B and Boolean combination of conditions 557B. With respect to lead times such as 554A and 554B, the anomaly detection plans 550 may indicate, for example, (a) the set of different lead times to be considered in combination, and (b) which of the two approaches shown in elements 525 and 530 are to be used (or whether both approaches are to be used). Some anomaly detection plans may indicate Boolean conditions associated with multiple metrics or metrics combinations, logically equivalent to directives of the form: "initiate anomaly response action if ((anomaly score contribution of metric M1>threshold1) AND (anomaly score contribution of metric M2>threshold2)) OR (anomaly score contribution of metric M3>threshold3)". In some cases a Boolean combination of conditions 557 may indicate different response actions to be taken: e.g., a directive of the form "if (anomaly score contribution of metric M1>threshold1) initiate anomaly response action RA1; else if (anomaly score contribution of metric M1>threshold2) initiate anomaly response action RA2."

Example Parameter Selection for Multi-Factor Anomaly Detection

Figure 6:
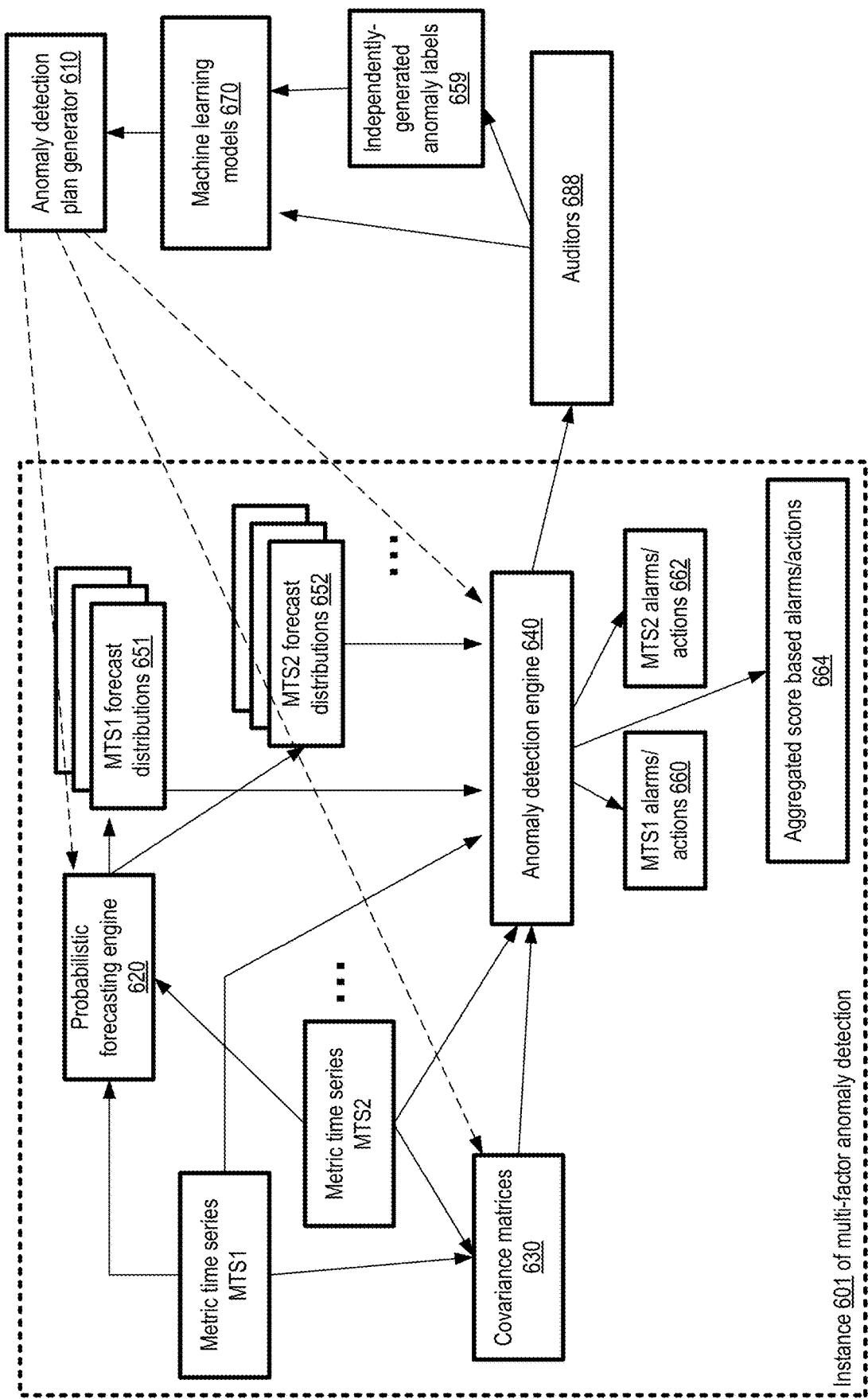
FIG. 6 illustrates example machine learning based parameter selection experiments which may be conducted to generate anomaly detection plans, according to at least some embodiments.

FIG. 6 illustrates example machine learning based parameter selection experiments which may be conducted to generate anomaly detection plans, according to at least some embodiments. In an instance 601 of multi-factor anomaly detection, at least two time series are taken into consideration: metric time series MTS1 and MTS2. Respective per-metric forecasting models are trained for the two time series and executed at a probabilistic forecasting engine 620, resulting in MTS1 forecast distributions 651 (for various points of time) and MTS2 forecast distributions 652. Covariance matrices 630 may be computed for the values of MTS1 and MTS2 over some time periods, and provided as input to anomaly detection engine 640 along with the MTS1 forecast distributions 651, MTS2 forecast distributions 652, and observed (post-prediction) values of MTS1 and MTS2 in the depicted embodiment. The anomaly detection engine 640 may use a current version of an anomaly detection plan to combine the information provided to it as input, and generate up to three types of anomaly response actions based on the analysis of the input. MTS1 alarms/actions 660 may be initiated if the post-prediction MTS1 values satisfy a single-metric anomaly score threshold. MTS2 alarms/actions 662 may be initiated if the post-prediction MTS2 values satisfy a single-metric anomaly score threshold, and aggregated score based alarms/actions 664 may be initiated if the combination of the anomaly score contributions with respect to MTS1 and MTS2 satisfy a different threshold. Depending on the anomaly detection plan, in some embodiments only alarms/actions triggered by aggregated scores may be initiated.

In the embodiment depicted in FIG. 6, anomaly detection plan generator 610 may utilize machine learning models 670 to identify combinations of parameters to be employed in the instances of multi-factor anomaly detection. Results (e.g., overall anomaly scores) obtained using a given combination of parameters (e.g., the number of per-metric and multi-metric forecasts used, the lead times considered, etc.) from the anomaly detection engine 640 for respective instances of multi-factor anomaly detection may be provided to the machine learning models 660 as input, along with independently-generated anomaly labels 659 for the combinations of metrics being considered in each of the instances. In some embodiments, the results obtained from the anomaly detection engine 640 may first be provided to one or more auditors 688; if approved by the auditors, the results may be provided to the machine learning models. The auditors may provide at least some of the anomaly labels 659 in various embodiments. In other embodiments, at least some results may not necessarily be audited before they are provided to the machine learning models. The machine learning models 670 may in effect compare the anomalies identified by the anomaly detection engine 640 with the labeled anomaly information, and identify candidate parameter modifications to be tried. The candidate parameters may be transmitted to various components of the multi-factor anomaly detection system, as indicated by the dashed arrows from the anomaly detection plan generator 610 to the probabilistic forecast engine, the covariance matrices 630, and anomaly detection engine 640. Example parameters modified at the probabilistic forecasting engine based on the recommendations of the machine learning models 670 may include changes to the combinations of forecast models to be used, hyper-parameters of the models, and so on in some embodiments. Example covariance-related parameters modified based on the recommendations of the machine learning models 670 may include changes to specific pairs of metrics for which covariance is to be computed, time periods over which the covariance is to be computed, etc. Example parameters modified at the anomaly detection engine based on the recommendations of the machine learning models 670 may include changes to the thresholds used for determining anomalies, the Boolean combination of conditions used, mapping functions between prediction sub-ranges and anomaly contribution scores, and so on in various embodiments.

Example Programmatic Interactions

Figure 7:
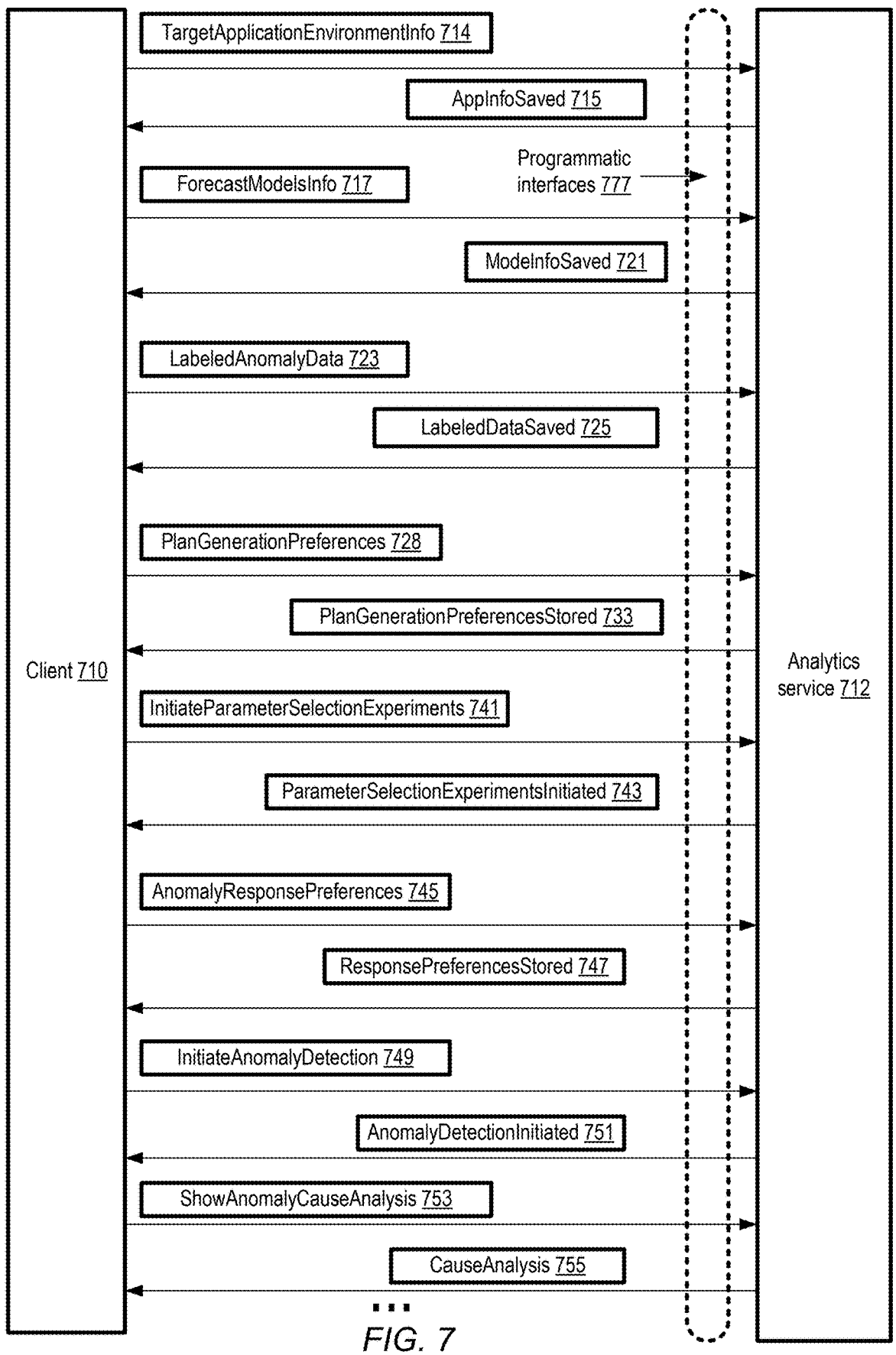
FIG. 7 illustrates example programmatic interactions pertaining to multi-factor anomaly detection, according to at least some embodiments.

FIG. 7 illustrates example programmatic interactions pertaining to multi-factor anomaly detection, according to at least some embodiments. An analytics service 712, similar in features and functionality to analytics service 102 of FIG. 1, may implement a set of programmatic interfaces 777 in the depicted embodiment. The programmatic interfaces may include one or more web-based consoles, command-line tools, APIs, graphical user interfaces and the like.

A client 710 of the analytics service may provide information to the analytics service about one or more target application environments for which multi-factor anomaly analysis is to be performed, e.g., via TargetApplicationEnvironmentInfo messages 714. The information may indicate the resources used for the applications (such as virtual or physical machines of provider network services, resources located at client-owned premises, resources located at third-party premises, and so on) and the sources from which metrics pertaining to the applications can be obtained (e.g., tools implemented at provider network services, monitoring agents installed at various servers used for the applications, log files from which application logic-based metrics can be obtained, etc.) in at least some embodiments. In some embodiments in which the analytics service 102 is implemented as part of a suite of services of a provider network, and the target application environments also use provider network services, the analytics service 102 may be able to utilize a monitoring service of the provider network which automatically captures metrics such as CPU utilization, memory utilization, network traffic rates and the like to obtain time series of various metrics. The information about the targeted application execution environments may be stored at a repository of the analytics service 712, and an AppInfoSaved message 715 may be sent to the client.

According to some embodiments, a client 710 may provide guidance to the analytics service about the types of probabilistic models which are to be used for generating forecasts for individual metrics and/or combinations of metrics jointly, e.g., via one or more ForecastModelsInfo messages 717. In some embodiments, the client may provide pre-trained forecast models. In other embodiments, the client may use ForecastModelsInfo messages to request the training of forecast models at the analytics service, e.g., by indicating the types of models (recurrent neural networks, transformers, sequence convolutional neural networks, autoregressive moving average models, etc.) to be trained, whether single-metric forecasting models or joint forecasting models are to be trained, and so on. In response, the analytics service may store the provided model-related preferences, initiate the training of the models if training is requested, and send a ModelsInfoSaved message 721 to the client.

In at least one embodiment, a client 710 may provide a set of labeled anomaly data to the analytics service 712, which may be used at the service to train machine learning models which provide recommended parameters for multi-factor anomaly detection. The labeled data may indicate, for example, decisions reached by application administrators, root cause analysis teams, application support staff and the like as to whether a set of time series values of some number of metrics actually represented an actionable anomaly or not. Such labeled anomaly data sent in one or more LabeledAnomalyData messages 723 may be saved at a repository of the analytics service 712, and a LabeledDataSaved message 725 may be sent back to the client 710 in at least one embodiment.

A client 710 may provide a set of preferences regarding the anomaly detection plan generation procedure for a given application in some embodiments, e.g., via a PlanGenerationPreferences message 728. Such preferences may indicate, for example, a starting combination of models and metrics to be used in the plan, Boolean conditions of the kind discussed above, mapping functions for determining anomaly score contributions, thresholds to be used for determining whether an aggregated anomaly score is to be interpreted as an actionable anomaly, and so on. The preferences may be stored at the analytics service and used to generate anomaly detection plans on behalf of the client. A PlanGenerationPreferencesStored message 733 may be sent to the client to confirm the receipt of the preferences in the depicted embodiment.

In at least some embodiments, instead of or in addition to providing specific guidelines or preferences regarding anomaly detection plane, a client 710 may request that the analytics service begin a set of parameter selection experiments whose results can be used to generate or modify anomaly detection plans, e.g., using machine learning techniques of the kind discussed above. An InitiateParameterSelectionExperiments message 741 may be used to request such experiments in various embodiments. In response, the analytics service may choose an initial set of parameters for multi-factor anomaly detection (e.g., based on input provided by the client via an earlier PlanGenerationPreferences message 728, or based on knowledge base entries accessible from the analytics service) and start experiments of the kind discussed in the context of FIG. 6 to tune the parameters if needed. A ParameterSelectionExperimentsInitiated message 743 may be sent to the client in some embodiments.

Preferences regarding the particular types of response actions to be undertaken if and when anomalies are detected in a target application execution environment may be provided by a client 710 via one or more AnomalyResponsePreferences messages 745 in the depicted embodiment. Response actions indicated in such messages may, for example, include generating alarm notifications, redirecting of one or more user requests of the application to one or more non-primary resources of the application, allocation of additional resources for execution of the application and/or initiation of a root cause analysis workflow. A ResponsePreferencesStored message 747 may be sent to the client after the response preferences have been stored at a repository.

In some embodiments, a client may request the initiation of multi-factor anomaly detection with respect to one or more application execution environments by submitting an InitiateAnomalyDetection request 749. In response, the analysis of metrics associated with the target application in accordance with an anomaly detection plan of the kind discussed above may be initiated, and an AnomalyDetectionInitiated message 751 may be sent to the client in at least one embodiments.

In at least some embodiments, analytics service 712 may be able to provide assistance to determine possible root causes of an anomaly or an anomaly-related failure event. A client 710 may submit a ShowAnomalyCauseAnalysis request 753 for such assistance, and results of causal analysis conducted at the analytics service 712 may be provided to the client via one or more CauseAnalysis messages 755. In one embodiment, a representation of observed values of one or more metrics of the application over a selected time interval (e.g., a time interval shortly before, or leading up to the detection of an anomaly) may be presented via a graphical user interface such as the interface depicted in FIG. 8. In some implementations, the representation may include one or more visual cues indicating a particular metric identified as a candidate for further analysis, e.g., to dig deeper into the underlying causes of the anomaly.

FIG. 8 illustrates an example graphical user interface which may be used to indicate candidate metrics for investigation in some embodiments, according to at least some embodiments. Web-based interface 802 implemented by an analytics service similar to analytics service 102 of FIG. 1 includes a message area 877 and several metric time series graphs associated with a detected anomaly in the depicted embodiment. As indicated in the message area 877, an anomaly has been detected for an application MyApp1 because of an increase in divergence between a pair of key metrics M1 and M2, with an anomaly detection threshold being reached in a time interval around 08:00 UTC on an indicated date. Graph 805 shows a normalized representation of the change in divergence between M1 and M2 as a function of time, with an acceptable range of divergence being shown using dashed horizontal lines.

As part of the actions initiated after the detection of the anomaly, the analytics service may conduct an analysis of various other metrics collected during a time interval prior to the discovery of the anomaly in the depicted embodiment. The analytics service may identify one or more other metrics whose changes in value during the time interval may suggest further investigation, even if those values by themselves did not result in a detection of an anomaly with respect to those other metrics. In the depicted embodiment, metrics M3 (whose values for approximately an hour before the detection of the divergence-based anomaly are shown in graph 807) and M4 (whose values over the same duration are shown in graph 809) have been identified as potential candidates for further analysis. The value of M3 had remained fairly flat until a few minutes before 08:00 UTC in the depicted example scenario, after which it started fluctuating while still remaining within acceptable range. The value of M4 had also remained fairly flat until a few minutes before 08:00 UTC, after which it fell. As shown, the web-based interface 802 may include visual cues (e.g., the oval shapes superimposed on graphs 807 and 809, indicating the start of the candidate metric changes 855 for further investigation) to indicate the metrics and times for which further analysis may be merited. Such analysis may include, for example, examination of log messages associated with the resources or logical application components from which the candidate metrics were collected, and may be able to help explain the increase in M1-M2 divergence in the depicted scenario.

Web-based interface 802 also includes an interface element 811 for requesting the display of additional metrics and an interface element 812 which allows a viewer to zoom in (to view metric changes at a finer time granularity than is used by default) or zoom out (to view the metrics at a coarser time granularity) in the depicted embodiment. Other types of interface elements may also be provided in different embodiments to enable viewers to explore the metrics values around the time that the M1-M2 divergence anomaly was discovered and to help identify the root cause(s) of the anomaly.

In some embodiments, a different combination of programmatic interactions and interfaces pertaining to anomaly analysis may be supported than those shown in FIG. 7 or FIG. 8. For example, programmatic interactions may be used by clients to modify anomaly detection thresholds selected by the analytics service.

Example Provider Network Environment

Figure 9:
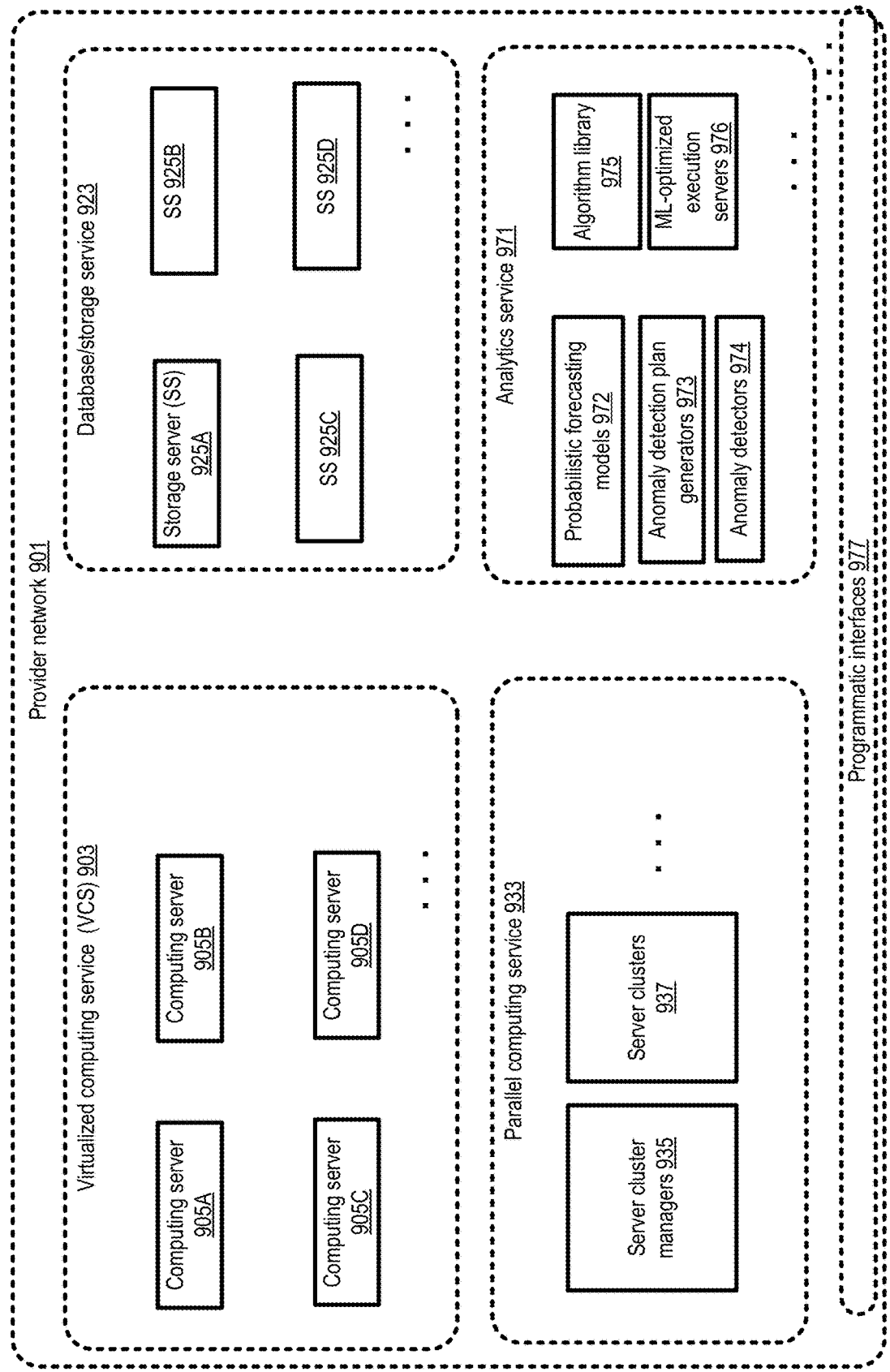
FIG. 9 illustrates an example provider network environment in which an analytics service may be used to perform multi-factor anomaly detection, according to at least some embodiments.

In some embodiments, as mentioned earlier, an analytics service supporting anomaly detection techniques similar to those described above may be implemented at a provider network. FIG. 9 illustrates an example provider network environment in which an analytics service may be used to perform multi-factor anomaly detection, according to at least some embodiments. In the depicted embodiment, provider network 901 may comprise resources used to implement a plurality of services, including for example a virtualized computing service (VCS) 903, a database/storage service 923, and a parallel computing service 933 as well as an analytics/machine learning service 971 at which multi-factor anomaly analysis may be conducted. The analytics service 971, which may also be referred to as a machine learning service or an artificial intelligence service, in turn may comprise algorithm library 975, probabilistic forecasting models 972, anomaly detection plan generators 973 and anomaly detectors 974 as well as a set of machine learning-optimized execution servers 976 in the depicted embodiment. The probabilistic forecasting models 972 and the anomaly detection plan generators 973 may utilize various types of machine learning models from algorithm library 975, including but not limited to deep neural network models in the depicted embodiment. The parallel computing service 933 may comprise various server clusters 937, each comprising a plurality of servers, on which parallelizable workloads may be distributed by a set of server cluster managers 935 in the depicted embodiment. Some of the algorithms implemented at the analytics service 971 may be parallelizable, and may utilize the server clusters 937 in at least some embodiments.

Components of a given service may utilize components of other services in the depicted embodiment—e.g., for some analytics service tasks, virtual machines implemented at computing servers such as 905A-905D of the virtualized computing service 903 may be used, server clusters 937 and/or cluster managers 935 may be utilized for parallelizable computations of the analytics service, input data (e.g., time series values) and/or output produced at the analytics service may be stored at storage servers 925 (e.g., 925A-925D) of storage service 923, and so on. In various embodiments, the application execution environments with respect to which anomaly detection analysis is performed by the analytics service may include resources of other provider network services, such as VCS 903, database/storage service 923, parallel computing service 933 and the like. In some embodiments, the provider network 901 may also include a monitoring service which can set up agents at other provider network services and gather metrics time series values from the agents (or from other tools). Individual ones of the services shown in FIG. 9 may implement a respective set of programmatic interfaces 977 which can be used by external and/or internal clients (where the internal clients may comprise components of other services) in the depicted embodiment.

In some embodiments, at least some aspects of the anomaly detection techniques described herein may be implemented without acquiring resources of network-accessible services such as those shown in FIG. 9. For example, a standalone tool implemented at one or more computing devices which are not part of a network-accessible service may be used in one embodiment.

Methods for Multi-Factor Anomaly Detection

Figure 10:
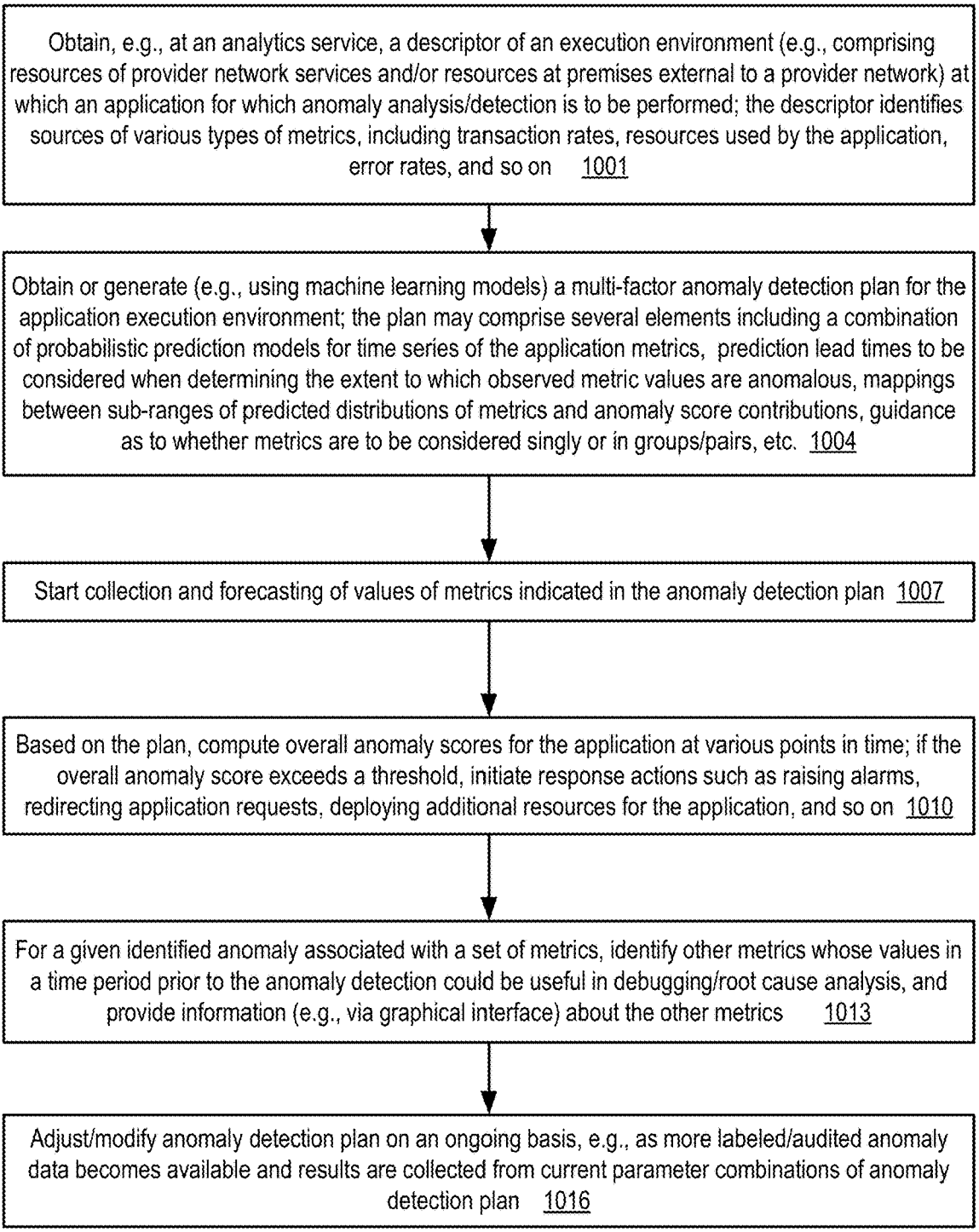
FIG. 10 is a flow diagram illustrating aspects of operations that may be performed to detect anomalies using multiple contributing factors in application execution environments, according to at least some embodiments.

FIG. 10 is a flow diagram illustrating aspects of operations that may be performed to detect anomalies using multiple contributing factors in application execution environments, according to at least some embodiments. As shown in element 1001, a descriptor or indication of an execution environment of an application for which anomaly analysis is to be performed may be obtained, e.g., via programmatic interfaces of an analytics service similar in features and functionality to analytics service 102 of FIG. 1. The application may utilize a variety of resources, e.g., including resources such as computing servers and storage servers of a provider network or cloud-based environment, servers located at premises external to the provider network. Information about the resources used as well as sources (e.g., performance tools, monitoring service agents and the like) from which values of metrics associated with the resources can be obtained may be provided in the descriptor in some embodiments. In at least one embodiment, information about various application logic subcomponents, such as micro-services which interact with another to implement the business logic of the application, may also be provided in the application descriptor, as well as an indication of metrics sources for application logOc-based metrics (such as end user transaction/request arrival and completion rates, response times for the end user requests and transactions, message rates between different subcomponents, and so on). In embodiments in which the application is exposed to its end users via one or more wen sites, the application descriptor may indicate sources (such as web server logs) for navigation-related metrics associated with the web sites, such as transitions between pairs of web pages via web links.

A multi-factor anomaly detection plan for the application execution environment may be obtained or generated (e.g., using one or more machine learning models) in some embodiments (element 1004). To train the models, in some embodiments, labeled data sets indicating anomalies detected in the past (and associated metrics values) may be used. The anomaly detection plan may comprise several elements in different embodiments, including for example combinations of probabilistic prediction models for time series of the application metrics to be used for anomaly detection, prediction lead times to be considered when determining the extent to which observed metric values are anomalous, mappings between sub-ranges of predicted distributions of metrics and anomaly score contributions of the metrics, guidance as to whether metrics are to be considered singly or in groups/pairs, etc. In one example scenario, for example, pairwise analysis of at least some metrics may be indicated in the plan, enabling correlations, divergence or other intra-pair value relationships between some pairs of metrics over time to be included as factors contributing to an overall anomaly score. In some embodiments, the plan may indicate Boolean combinations of conditions with respect to a plurality of metrics or forecasts which are to be used to determine anomaly scores. Thresholds for determining whether an anomaly score requires a response action may be included in the plan in some embodiments.

In effect, in various embodiments, the plan may provide rules for determining some number of anomaly score contributions using some number of forecasting models at various points in time based on observed values of application metrics, and for aggregating the scores to arrive at an overall anomaly score. In some embodiments, the plan may indicate how frequently overall anomaly scores are to be computed for the application, how frequently new probability distribution predictions are to be obtained from the set of probabilistic forecasting models being used, for often the probabilistic forecasting models are to be retrained as new time series data becomes available, and so on. A wide variety of probabilistic forecasting models may be used for metric time series in different embodiments, including for example recurrent neural network based models, transformer models, convolutional neural network based models, or autoregressive moving average models. In at least one embodiment, one or more of the probabilistic forecasting models used may produce joint forecasts of several different metrics.

Collection and forecasting of the application metrics indicated in the anomaly detection plan may be initiated (element 1007) in various embodiments. Based on the anomaly detection plan, overall anomaly scores may be computed for the application at various points in time in the depicted embodiment (element 1010). The procedure for generating the overall score may comprise generating respective score contributions associated with several different metrics (or groups of metrics) and then aggregating the contributions (e.g., using techniques such as summing, averaging, etc. or using Boolean conditions indicated in the plan). A variety of prediction lead times and mapping functions may be taken into account when generating the anomaly score contributions for some metrics, as indicated in the plan. Multi-metric anomaly score contributions such as contributions based on divergence or correlation of pairs/groups of metrics may be computed in some cases based on the contents of the plan. If the aggregated or overall anomaly score exceeds a threshold for a given point in time, or for some successive points in time, an anomaly response action may be initiated in at least some embodiments. Such response actions may include, among others, generating an alarm notification, redirection of one or more user requests of the application to one or more alternate or non-primary resources of the application, allocation of one or more additional resources for execution of the application and/or initiation of a root cause analysis workflow.

In some embodiments, if an anomaly is detected/identified, the analytics service may examine collected observations of other metrics (which may not necessarily be indicated as being closely related to one another) over some time period prior to the detection of the anomaly in some embodiments, to determine whether the values of those metrics may be helpful in debugging/root cause analysis of the detected anomaly (element 1013). Machine learning models may also be used for such analysis. A graphical user interface similar to that shown in FIG. 8 may be used to provide clients of the analytics service a recommendation about investigating such other metrics in one embodiment.

According to at least some embodiments, the anomaly detection plan may be adjusted/modified on an ongoing or continuous basis (element 1016). As more audited/labeled anomaly data becomes available, and as more anomaly analysis results are collected from the current parameter combinations, machine learning models which were used for generating the plan may be retrained, for example.

It is noted that in various embodiments, some of the operations shown in the flow diagram of FIG. 10 may be implemented in a different order than that shown in the figure, or may be performed in parallel rather than sequentially. Additionally, some of the operations shown in FIG. 10 may not be required in one or more implementations.

Use Cases

The techniques described above, of automatically generating anomaly detection plans based on multiple factors for complex application execution environments may be extremely beneficial in a variety of scenarios. Many applications such as store web sites are run using a wide variety of distributed resources, including physical and virtual resources of several services of cloud computing environments as well as resources located at premises outside the cloud. Even short-duration outages of such applications may lead to substantial negative consequences (e.g., dissatisfied end users, reduction in transactions completed, etc.) for the organizations on whose behalf the applications are run. Detecting and remediating the causes of such outages quickly may be extremely important. However, due to the large number of resources involved and their complex interdependencies, it may be hard to manually configure settings which can be used to detect outage-causing problems. The proposed techniques, in which machine learning techniques are used to automate the identification of relevant anomalous behavior with respect to multiple forecasts from a number of different models, and with a number of different forecast lead times considered, may help to speed up responses to failure events and prevent some types of outages.

Illustrative Computer System

Figure 11:
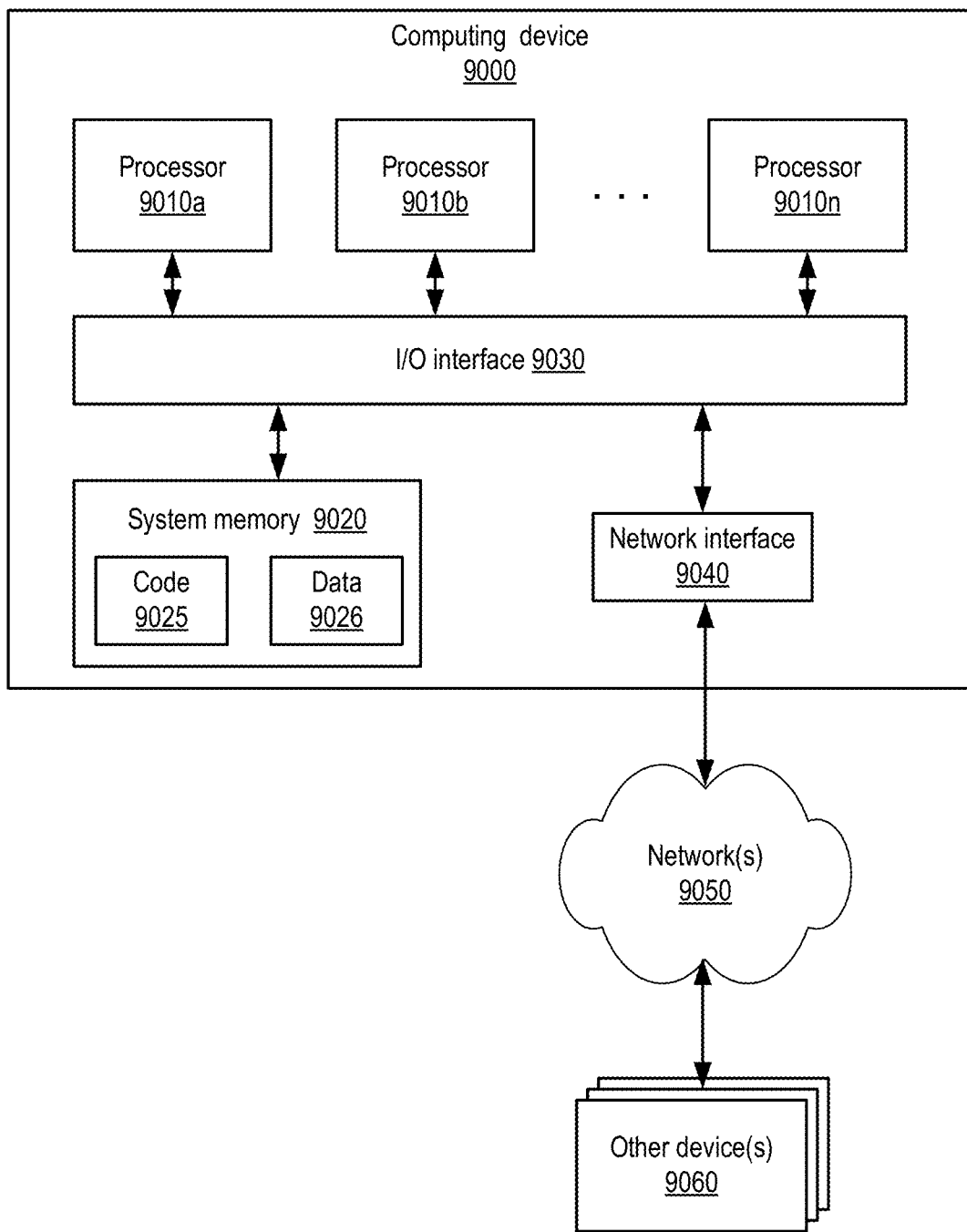
FIG. 11 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices cause the one or more computing devices to:
   identify a plurality of metrics associated with an application obtained from different, respective sources, wherein the plurality of metrics comprise:
     one or more resource-specific metrics for one or more computer resources executing the application; and
     one or more application-logic based metrics for performance of one or more operations of the application;
   determine an anomaly detection plan for the application, wherein the anomaly detection plan indicates:
     (a) one or more probabilistic forecasting models, including a first probabilistic forecasting model which generates a predicted probability distribution of future values of one or more time series of the plurality of metrics associated with the application,
     (b) one or more prediction lead times for which measured values of the plurality of metrics are to be analyzed with respect to predicted probability distributions of the plurality of metrics,
     (c) at least a first mapping between a range subdivision of a predicted probability distribution for a particular metric and an anomaly score contribution computed with respect to the particular metric, and
     (d) that an anomaly score for the application is to be based at least in part on group-wise analysis of at least a first group of metrics of the application comprising the one or more resource-specific metrics and the one or more application-logic based metrics;
execute the anomaly detection plan, wherein to execute the anomaly detection plan, instructions cause the one or more computing devices to generate the anomaly score of the application with respect to a set of observed values of the plurality of metrics of the application including the one or more resource-specific metrics and the one or more application logic-based metrics, wherein generation of the anomaly score comprises:
aggregating a plurality of anomaly score contributions, including:
(a) a first anomaly score contribution associated with a divergence of values of the one or more resource-specific metrics and the one or more application-logic based metrics; and
(b) a second anomaly score contribution obtained using the first mapping and a particular prediction lead time of the one or more prediction lead times; and
cause, in response to a determination that the anomaly score of the application exceeds a threshold, one or more anomaly response operations to be initiated.

2. The system as recited in claim 1, wherein the one or more computing devices include further instructions that upon execution on or across the one or more computing devices further cause the one or more computing devices to:
obtain, via one or more programmatic interfaces, a descriptor of the application, wherein the descriptor indicates that the one or more computing resources utilized by the application is a resource of a network-accessible service of a provider network.

3. The system as recited in claim 1, wherein the one or more computing devices include further instructions that upon execution on or across the one or more computing devices further cause the one or more computing devices to:
obtain, via one or more programmatic interfaces, a training data set indicating one or more anomalies detected with respect to one or more metric time series; and
train, using the training data set as input, a machine learning model, wherein determining the anomaly detection plan comprises obtaining at least a portion of the anomaly detection plan from the machine learning model.

4. The system as recited in claim 1, wherein the one or more computing devices include further instructions that upon execution on or across the one or more computing devices further cause the one or more computing devices to:
obtain, via one or more programmatic interfaces, an indication of an anomaly response operation of the one or more anomaly response operations.

5. The system as recited in claim 1, wherein the one or more probabilistic forecast models include a model which produces a joint forecast for a plurality of metrics associated with the application.

6. A computer-implemented method, comprising:
identifying, for an application, a plurality of metrics obtained from different, respective sources, wherein the plurality of metrics comprise:
one or more resource-specific metrics for one or more computer resources executing the application; and
one or more application-logic based metrics for performance of one or more operations of the application;
determining an anomaly detection plan for the application, wherein the plan indicates:
(a) one or more models to be employed to analyze a collection of metric time series of the application, wherein the collection of metric time series comprises one or more resource-specific metric time series and one or more application-logic based metric time series, wherein the one or more models include at least one probabilistic forecasting model which generates a predicted probability distribution of future values of one or more of the metric time series provided as input to the probabilistic forecasting model; and
(b) that an anomaly score for the application is to be based at least in part on value relationships between metrics from different ones of the respective sources, including the one or more resource-specific metrics and the one or more application logic-based metrics of the application;
executing the anomaly detection plan, comprising generating the anomaly score of the application with respect to a set of observed values of the plurality of metrics of the application including the one or more resource-specific metrics and the one or more application logic-based metrics, wherein generation of the anomaly score comprises:
computing a plurality of anomaly score contributions, including:
a first anomaly score contribution associated with an analysis of a relationship between values of at least the one or more resource-specific metrics and the one or more application logic-based metrics; and
a second anomaly score contribution obtained using a mapping between an observed value of one of the plurality of metrics and a range subdivision of a predicted probability distribution generated for the one metric using the one or more models; and
in response to determining that the anomaly score exceeds a threshold, causing one or more anomaly response operations to be initiated.

7. The computer-implemented method as recited in claim 6, wherein the one or more anomaly response operations comprise one or more of: (a) an alarm notification, (b) a redirection of one or more user requests of the application, (c) allocation of one or more additional resources for execution of the application or (d) initiation of a root cause analysis workflow.

8. The computer-implemented method as recited in claim 6, wherein generation of the anomaly score comprises:
evaluating a Boolean combination of a plurality of conditions indicated in the anomaly detection plan.

9. The computer-implemented method as recited in claim 6, wherein determining the anomaly detection plan comprises:
obtaining at least a portion of the anomaly detection plan from one or more machine learning models.

10. The computer-implemented method as recited in claim 6, further comprising:
in response to determining that the anomaly score exceeds the threshold, causing a representation of observed values of one or more of the plurality of metrics of the application over a selected time interval to be presented via a graphical user interface, wherein the representation includes one or more visual cues indicating a particular metric identified as a candidate for further analysis.

11. The computer-implemented method as recited in claim 6, wherein generation of the anomaly score comprises:
  computing, with respect to a particular metric, respective anomaly score contributions associated with a plurality of prediction lead times for which respective predicted probability distributions are generated during a particular execution of a particular probabilistic forecasting model, wherein the plurality of prediction lead times are indicated in the anomaly detection plan.

12. The computer-implemented method as recited in claim 6, wherein generation of the anomaly score comprises:
  computing, with respect to a particular metric, a plurality of anomaly score contributions associated with a particular prediction time, wherein individual ones of the plurality of anomaly score contributions are determined using respective predicted probability distributions generated by respective executions of a particular probabilistic forecasting model.

13. The computer-implemented method as recited in claim 6, wherein the first probabilistic forecasting model comprises one or more of: (a) a recurrent neural network, (b) a transformer model, (c) a convolutional neural network, or (d) an autoregressive moving average model.

14. The computer-implemented method as recited in claim 6, wherein the one or more resource-specific metrics comprise of one or more of: (a) a transaction metric of the application, (b) a resource utilization metric associated with one or more resources used for the application, (c) a latency metric, (d) an error metric, or (e) a metric associated with navigation between respective portions of one or more web sites.

15. The computer-implemented method as recited in claim 6, further comprising:
  obtaining an anomaly detection request via one or more programmatic interfaces of a network-accessible service of a provider network, wherein the generating of the anomaly score is responsive to the anomaly detection request.

16. One or more non-transitory computer-accessible storage media storing program instructions that when executed on or across one or more processors cause the one or more processors to:
  determine that anomaly analysis is to be performed with respect to an application according to an anomaly detection plan generated for the application based, at least in part, on a plurality of metrics identified for the application and obtained, from different, respective sources, wherein the plurality of different metrics comprise one or more resource specific metrics for one or more computer resources executing the application and one or more application-logic based metrics for performance of one or more operations of the application;
  execute the anomaly detection plan, wherein to execute the anomaly detection plan, the instructions cause the one or more processors to generate an anomaly score of the application with respect to a set of observed values of a plurality of metrics of the application including the one or more resource-specific metrics and the one or more application-logic based metrics, wherein generation of the anomaly score comprises computing a first anomaly score contribution associated with an analysis of a correlation between values of the one or more resource-specific metrics and the one or more application-logic based metrics; and
  in response to a detection that the anomaly score exceeds a threshold, cause one or more anomaly response operations to be initiated.

17. The one or more non-transitory computer-accessible storage media as recited in claim 16, wherein the one or more anomaly response operations comprise one or more of: (a) an alarm notification, (b) a redirection of one or more user requests of the application to one or more non-primary resources of the application, (c) allocation of one or more additional resources for execution of the application or (d) initiation of a root cause analysis workflow.

18. The one or more non-transitory computer-accessible storage media as recited in claim 16, storing further program instructions that when executed on or across one or more processors further cause the one or more processors to:
  utilize one or more machine learning models to generate at least a portion of an anomaly detection plan, wherein the anomaly score is generated based at least in part on one or more other anomaly score contributions indicated in the anomaly detection plan.

19. The one or more non-transitory computer-accessible storage media as recited in claim 16, wherein generation of the anomaly score comprises obtaining respective probabilistic metric forecasts from one or more forecasting models, wherein a particular model of the one or more forecasting models comprises one or more of: (a) a recurrent neural network, (b) a transformer model, (c) a convolutional neural network, or (d) an autoregressive moving average model.

20. The one or more non-transitory computer-accessible storage media as recited in claim 16, wherein the one or more resource-specific metrics comprise one or more of: (a) a transaction metric of the application, (b) a resource utilization metric associated with one or more resources used for the application, (c) a latency metric, (d) an error metric, or (e) a metric associated with navigation between respective portions of one or more web sites.

* * * * *